US010917396B2

(12) United States Patent
Matthews et al.

(10) Patent No.: US 10,917,396 B2
(45) Date of Patent: *Feb. 9, 2021

(54) SYSTEMS AND METHODS FOR CREDENTIALING OF NON LOCAL REQUESTORS IN DECOUPLED SYSTEMS UTILIZING A DOMAIN LOCAL AUTHENTICATOR

(71) Applicant: OPEN TEXT SA ULC, Halifax (CA)

(72) Inventors: Glen Matthews, Montreal (CA); Jonathan Carroll, Beaconsfield (CA); Aladin Dajani, Montreal (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/442,771

(22) Filed: Jun. 17, 2019

(65) Prior Publication Data

US 2019/0306139 A1    Oct. 3, 2019

Related U.S. Application Data

(63) Continuation of application No. 16/006,394, filed on Jun. 12, 2018, now Pat. No. 10,367,801, which is a continuation of application No. 14/918,705, filed on Oct. 21, 2015, now Pat. No. 10,021,084.

(60) Provisional application No. 62/069,736, filed on Oct. 28, 2014.

(51) Int. Cl.
*H04L 29/06* (2006.01)
*H04L 29/08* (2006.01)

(52) U.S. Cl.
CPC .............. *H04L 63/08* (2013.01); *H04L 63/10* (2013.01); *H04L 67/06* (2013.01); *H04L 67/10* (2013.01); *H04L 67/14* (2013.01); *H04L 67/42* (2013.01)

(58) Field of Classification Search
CPC ......... H04L 63/08; H04L 63/10; H04L 67/10; H04L 67/14; H04L 67/42; H04L 67/06
See application file for complete search history.

(56) References Cited

U.S. PATENT DOCUMENTS

| 6,223,209 B1 | 4/2001 | Watson |
| 6,304,974 B1 | 10/2001 | Samar |
| 10,021,084 B2 | 7/2018 | Matthews et al. |
| 10,367,801 B2 | 7/2019 | Matthews |

(Continued)

OTHER PUBLICATIONS

Office Action issued for U.S. Appl. No. 14/918,705, dated Jul. 12, 2017, 10 pages.

(Continued)

*Primary Examiner* — Michael R Vaughan
(74) *Attorney, Agent, or Firm* — Sprinkle IP Law Group

(57) ABSTRACT

Embodiments as disclosed provide systems and methods that use a local authenticator within a domain to provide a credential to access a resource of the domain to a non-local requestor. When a request is received from a non-local requestor at the domain the non-local requestor can be authenticated based on the request. The local authenticator can then be accessed to obtain a credential. This credential may be the same type of credential provided to members of the domain when they authenticate using the local authenticator. The credential is provided to the non-local requestor so the non-local requestor can access the resource of the domain using the credential and authentication of the non-local requestor with respect to these accesses can be accomplished using the local domain authenticator and the credential.

20 Claims, 8 Drawing Sheets

(56) References Cited

U.S. PATENT DOCUMENTS

| | | |
|---|---|---|
| 2001/0042110 A1 | 11/2001 | Furusawa et al. |
| 2003/0051171 A1 | 3/2003 | Pearson |
| 2005/0132049 A1 | 6/2005 | Inoue et al. |
| 2006/0020679 A1 | 1/2006 | Hinton et al. |
| 2007/0234417 A1 | 10/2007 | Blakley, III et al. |
| 2008/0134305 A1 | 6/2008 | Hinton et al. |
| 2010/0281262 A1 | 11/2010 | Cheng et al. |
| 2012/0011578 A1 | 1/2012 | Hinton et al. |
| 2012/0257743 A1 | 10/2012 | Van Der Veen |
| 2014/0283010 A1 | 9/2014 | Rutkowski et al. |
| 2014/0331297 A1 | 11/2014 | Innes et al. |
| 2015/0301839 A1 | 10/2015 | Bansal |
| 2016/0119306 A1 | 4/2016 | Matthews et al. |
| 2016/0191242 A1 | 6/2016 | Resch et al. |
| 2018/0332018 A1 | 11/2018 | Matthews et al. |

OTHER PUBLICATIONS

Office Action issued for U.S. Appl. No. 14/918,705, dated Nov. 28, 2017, 11 pages.
Notice of Allowance issued for U.S. Appl. No. 14/918,705, dated Mar. 14, 2018, 9 pages.
Office Action issued for U.S. Appl. No. 16/006,394, dated Nov. 14, 2018, 10 pages.
Notice of Allowance issued for U.S. Appl. No. 16/006,394, dated Mar. 15, 2019, 9 pages.

SYSTEMS AND METHODS FOR CREDENTIALING OF NON LOCAL REQUESTORS IN DECOUPLED SYSTEMS UTILIZING A DOMAIN LOCAL AUTHENTICATOR

CROSS-REFERENCE TO RELATED APPLICATION(S)

This application is a continuation of, and claims a benefit of priority under 35 U.S.C. § 120 of the filing date of, U.S. patent application Ser. No. 16/006,394, filed Jun. 12, 2018, entitled "SYSTEMS AND METHODS FOR CREDENTIALING OF NON-LOCAL REQUESTORS IN DECOUPLED SYSTEMS UTILIZING A DOMAIN LOCAL AUTHENTICATOR," now U.S. Pat. No. 10,367,801, issued on Jul. 30, 2019, which is a continuation of, and claims a benefit of priority under 35 U.S.C. § 120 of the filing date of, U.S. patent application Ser. No. 14/918,705, filed Oct. 21, 2015, entitled "SYSTEMS AND METHODS FOR CREDENTIALING OF NON-LOCAL REQUESTORS IN DECOUPLED SYSTEMS UTILIZING A DOMAIN LOCAL AUTHENTICATOR," now U.S. Pat. No. 10,021,084, issued on Jul. 10, 2018, which claims a benefit of priority under 35 U.S.C. § 119 from U.S. Provisional Application No. 62/069,736, filed Oct. 28, 2014, entitled "SYSTEM AND METHOD FOR SINGLE-USE CREDENTIALING OF NON LOCAL REQUESTORS IN DECOUPLED SYSTEMS UTILIZING A DOMAIN LOCAL AUTHENTICATOR," which are hereby fully incorporated by reference herein.

TECHNICAL FIELD

This disclosure relates generally to the acquisition of credentials to access a resource of a domain by a remote requestor utilizing an authenticator local to the domain. Specifically, this disclosure relates to embodiments of systems and methods that allow remote requestors to obtain and utilize credentials to access a resource of a domain in the same manner as a local requestor. Even more particularly, this disclosure relates to embodiments of systems and methods for the acquisition of single-use credentials in a distributed managed file transfer scenario such that distributed components of a managed file transfer architecture may obtain single-use credentials to utilize other components of the managed file transfer architecture using an authenticator local to the domain that includes the desired component.

BACKGROUND

Increasingly, in the computing world, functionality is distributed. Such distribution is achieved through the separation of functionality or data (collectively referred to as resources) needed for tasks, and the physical or logical decoupling of such resources. In order to accomplish certain tasks or applications multiple resources may therefore be needed. Thus, communications between various these distributed resources may be required when implementing that functionality.

To illustrate an example, to accomplish functionality associated with an application on a mobile device the application may communicate with one or more service providers that may be deployed at a remote location, such as on servers or in the cloud, and these service providers may, in turn, contact content servers or database servers to obtain needed data, etc. As another example, a cloud based service may have many components, where each component may be configured to accomplish different portions of the functionality of the service such that a coordinating service component may need to communicate with these various components in order to accomplish a task for the cloud based service.

As can be imagined, these types of architectures present certain difficulties. One of the most pressing of these difficulties has to do with security. In many cases the resources that are needed to accomplish particular functionality may reside in different domains. A domain may include an internet worked set of computers or applications associated with a particular entity, address, etc. Access to resources within a domain may, however, be restricted to known users of the domain. In the main, the authentication of these known users is performed using an authenticator associated with that domain using credentials associated with that domain and that specific user (e.g., an identifier and password).

Restricting access to resources to known users of the domain serves as a major impediment to proper functioning and communication between distributed resources. This situation exists mainly because, in many cases, a requestor (e.g., service or the like) may be required to communicate with a number of distinct domains and access a number of different resources to accomplish a particular task, and may even have to utilize different resources to accomplish different instances of the same task. A requestor may, however, not always be a known user of the domain where a desired resource resides.

Accordingly, what is needed are systems and methods that allow non-local requestors to utilize a resource of a domain while maintaining security.

SUMMARY

Embodiments as disclosed herein may provide systems and methods that may use a local authenticator within a domain to provide a credential to access a resource. When a request is received from a non-local requestor at a domain a secure connection may be opened with the non-local requestor. The non-local requestor can also be authenticated. This authentication may, for example, be done using a secure protocol, such as the protocol used to establish the secure connection.

An authenticator local to the domain can then be accessed to obtain a credential. The credential is provided to the non-local requestor so the non-local requestor can access the resource of the domain using the credential and authentication of the non-local requestor in conjunction with this access can be accomplished using the local domain authenticator and the credential.

In certain embodiments, a domain may include a set of resources, a local domain authenticator and a remote authenticator. The local domain authenticator may provide a credential for a member of the domain to use in accessing the set of resources of the domain during a session and authenticate the credential associated with the member of the domain. The remote authenticator may provide the credential to a non-local requestor which is not a member of the domain by receiving an authentication request from the non-local requestor, wherein the request is requesting to be authenticated for accessing the set of resources. The remote authenticator may authenticate the non-local requestor using the authentication request, access the local domain authenticator to obtain the credential associated with the domain, and provide the credential to the non-local requestor such that the non-local requestor can access the set of resources of the domain during a session maintained between the non-local requestor and the domain using the credential and authentication of an access of the non-local requestor to the set of resources during the session is performed using the local domain authenticator and the credential.

In certain embodiments, the authentication of the non-local requestor using the authentication request is accomplished using the Secure Shell (SSH) or SSH2 (collectively, SSH herein) protocol and session data associated with the non-local requestor is updated to indicate that the non-local requestor has been authenticated.

In other embodiments, authenticating a non-local requestor which is not a member of the domain includes receiving a credential request from the non-local requestor and, in response to the credential request, accessing the session data for the non-local requestor to determine if the non-local requestor has been authenticated.

In some other embodiments the remote authenticator has a local account with the local domain authenticator and the credential is associated with the local account.

Embodiments may also include receiving, at a remote authenticator in a domain with a set of resources, an authentication request from a non-local requestor which is not a member of the domain, wherein the request is to be authenticated for accessing the set of resources and authenticating the non-local requestor using the authentication request. A local domain authenticator may be accessed to obtain a credential, wherein the credential is for a member of the domain to use in accessing the set of resources of the domain during a session. The credential is provided to the non-local requestor, wherein the non-local requestor can access the set of resources of the domain during a session maintained between the non-local requestor and the domain using the credential and authentication of an access of the non-local requestor to the set of resources during the session is performed using the local domain authenticator to authenticate the credential.

Embodiments as disclosed may thus provide the technical advantage of allowing distributed computer networks and functionality to be implemented more securely by decoupling the management of requests and access from non-local requestors from the management and provisioning of accounts or credentials for domain local accounts. Moreover, embodiments may provide the technological improvement of increasing security in remote or distributed computing environments by allowing access to resources to be more tightly controlled by allowing a credential to be assigned and used by a local authenticator without having a non-local requestor communicate directly with or otherwise have access to, a local authenticator.

Additionally, authentication of multiple different non-local requestors can be achieved by a domain without using an intermediary service or authenticator. As another advantage, the credential may be utilized by a non-local requestor to access multiple resources with a domain, all without changing either the interfaces of those resources, the functioning of the local domain authenticator or having to re-authenticate or otherwise obtain credentials for each interaction with each resource.

Moreover, embodiments may leverage established protocols for secure connections, including those that employ public key cryptography, to allow a non-local requestor such access. Public keys can be easily distributed without any security via a certificate. The certificate can also include other information such as an IP address of a domain name so that authentication based on such a certificate can also validate the non-local requestor initiating an authentication.

These and other aspects and advantages of the disclosure will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of the disclosure, and the disclosure includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
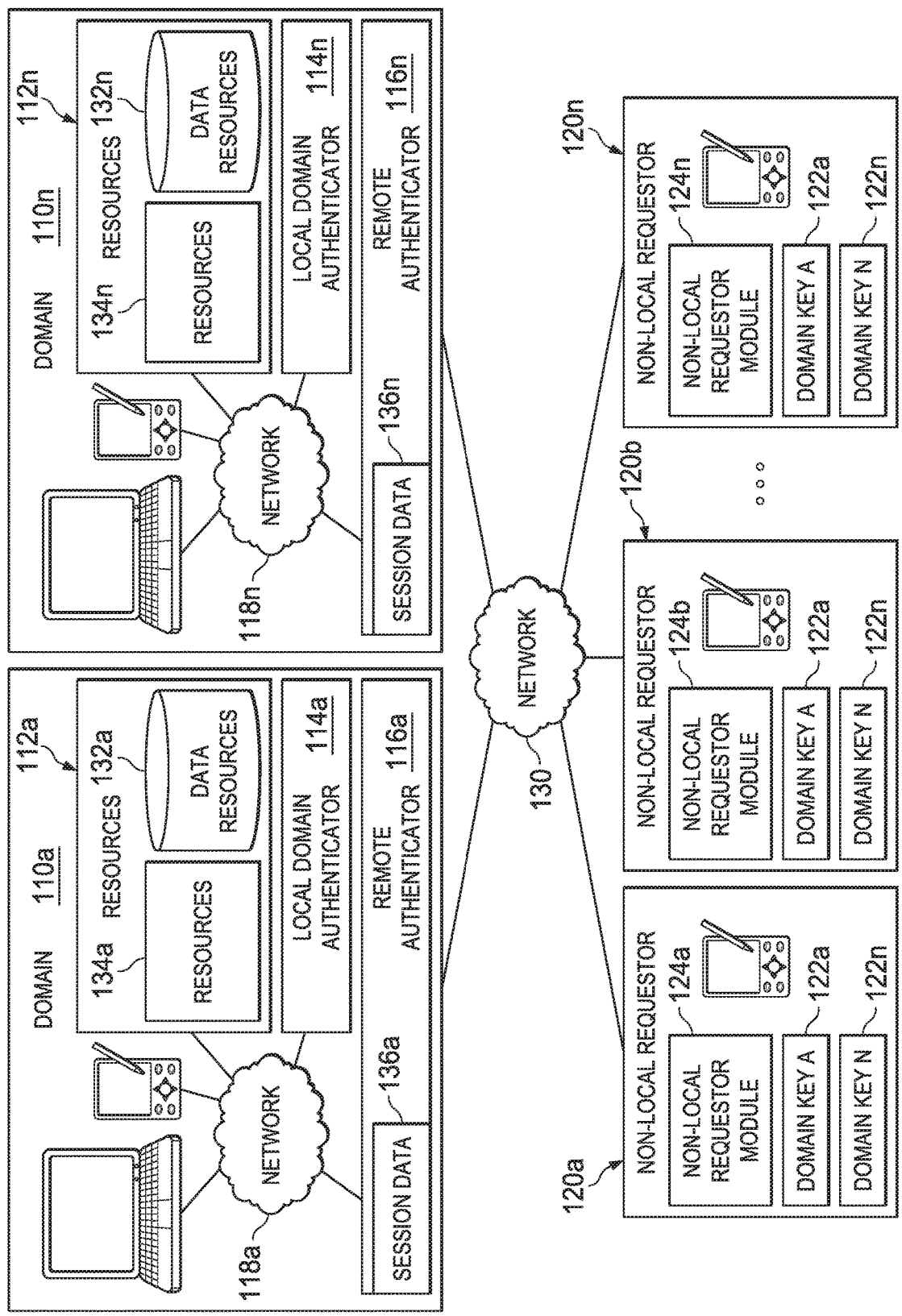
FIG. 1 depicts a diagrammatic representation of an embodiment of a system and architecture for authenticating a non-local requestor.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some brief context may be helpful. As discussed, in the computing world, functionality is often distributed. As such, communication between various resources may be needed in order to accomplish a number of tasks in a computing environment. The distribution of resources throughout, and among, what may be various heterogeneous domains presents certain difficulties. A domain may include an internet worked set of computers or applications associated with a particular entity, address, etc. Domains may have sub-domains, etc.

Because of these distributed architectures and ownership of these domains, security is in the top tier of these concerns. In particular, entities that operate these domains are loathe to give access to a requestor (e.g., a requesting resource such as a service or the like) of a resource within their domain (e.g., another service, an application, data, etc.) if the requestor is itself not local to that domain. In other words, access to resources within a domain may be restricted to known users of the domain. In the main, authentication of users within such a domain is performed using a local authenticator associated with that domain using credentials associated with that domain and that specific user (e.g., an identifier and password).

Restricting access to resources, however, serves as a major impediment to proper functioning and communication of distributed computing environments as, in many cases, access to different resources in different domains may be required to accomplish a particular task. Additionally, access to different resources in different domains may be needed to accomplish different instances of the same task. To configure each and every possible requestor to access such a large number of domains as a local user is a herculean task, as each domain may have different authentication mechanisms, require different credentials, have different levels of security with respect to different resources, etc.

Moreover, credentials for access to the domain or resource would need to be configured with respect to both requestor and domain in advance of a requestor's access, effectively preventing any sort of anonymous or unknown access to a domain or its resources. Furthermore, even if such a configuration could be accomplished access would be restricted only to those configured requestors, effectively preventing deployment of additional requesting resources without first performing such a configuration. As can be imagined, in today's highly distributed and fluid environments such an arrangement is untenable.

What is needed are systems and methods that allow a requestor to acquire credentials to utilize a resource of a domain to which it does not belong. It is also desirable that such systems and methods scale easily to a large number of participants and not require a secret key (e.g., a symmetric key) to be stored or distributed among a large number of sites. To those ends, among many others, embodiments as disclosed herein may provide systems and methods that may use a local authenticator within a domain to provide a credential to a non-local requestor to access a resource within the domain. When a request is received from the non-local requestor at the domain the non-local requestor can be authenticated based on the request. This authentication may, for example, be done leveraging established security protocols such as the Secure Shell (SSH) or SSH2 (collectively, SSH herein) protocol.

The local authenticator can then be accessed to obtain a credential. This credential may be the same type of credential provided to members of the domain when they authenticate using this local authenticator. This credential may be restricted in some manner (i.e., a single-use credential) where such restrictions may include, time based restrictions (e.g., during a single session), permission based restrictions or other types of restrictions. The single-use credential is provided to the non-local requestor so the non-local requestor can access the resource of the domain using the single-use credential and authentication of the non-local requestor with respect to these accesses can be accomplished using the local authenticator and the single-use credential.

Embodiments as disclosed may thus have the technical advantage of allowing distributed computer networks and functionality to be implemented more securely by decoupling the management of requests and access from non-local requestors from the management and provisioning of accounts or credentials for domain local accounts. Moreover, embodiments provide the technological improvement of increasing security in remote or distributed computing environments by allowing access to resources to be more tightly controlled by allowing single-use credentials to be assigned and used by a local authenticator without having a non-local requestor communicate directly with or otherwise have access to, a local authenticator. Additionally, authentication of multiple different non-local requestors can be achieved by a domain without using an intermediary service or authenticator.

As another advantage, the credential may be utilized by a non-local requestor to access multiple resources within a domain, all without changing either the interfaces of those resources or the functioning of the local authenticator.

Referring first to FIG. 1, one embodiment of an architecture for allowing non-local requestors to access resources of a domain to which they do not belong is depicted. Here, non-local requestors 120a, 120n (collectively 120) may be allowed to access resources 112a, 112b (collectively 112) at domains 110a, 110n (collectively 110) over network 130 using credentials as will be discussed. Network 130 may be the Internet, an intranet, a wireless or wired network, a local area network (LAN), a wide area network (WAN), some combination of these types of networks, etc. For purposes of this disclosure a requestor 120 is considered non-local to a domain 110 if the requestor 120 does not have user credentials or authentication information that local domain authenticator 114a, 114n (collectively 114) for the domain 110 would recognize as valid. Local domain authenticator 114 may be, for example, Open Text Directory Services (OTDS), Active Directory, Apache Directory Service or another type of access control or security component.

More specifically, domain 110 may include logically grouped members that may be administrated or secured to together, including for example, physical or logical resources such as users, computer devices, services (e.g., web services), data, applications, or other physical devices, functionality or data. The resources of domain 110 may communicate or otherwise be linked by domain network 118a, 118n (collectively 118). It will be noted that domain network 118 (or portions thereof) may be the same physical or logical network as network 130 (e.g., the Internet), however, resources 112 of domain 110 may be authenticated or otherwise identified as belonging to the domain 110.

Such an authentication process may be performed, for example, by local domain authenticator 114 and may utilize credentials that are specific to the domain 110 and have been established to identify a member of the domain 110. Local domain authenticator 114 may use the credentials associated with the domain 110 to authenticate local requests (e.g., from members within the domain). Thus, when a member (e.g., a user at a computer) is authenticated as a member of the domain 110 the member may be granted access to a set of resources 112 of the domain 110, which may include data resources 132a, 132n or other resources 134a, 134n that may be accessed such as services, including web services or the like or other applications or functionality. It will be noted that access controls may be implemented as is known, such that depending on the credentials of the member, a different level of access may be granted to the member or only a subset of resources 112 may be available for the member to access, etc.

More specifically, in most cases, when a member of the domain is authenticated using local domain authenticator 114 the member may be provided with a token or the like by local domain authenticator 114 where the token may be used with subsequent requests for resources 112. The member is then granted access to resources 112 based on the presence or use of this token. Specifically, when a resource 112 receives a request it may interact with local domain authenticator 114 of the domain 110 to provide the local domain authenticator 114 with the token. Local domain authenticator 114 validates the token and responds to the resource 112 informing the resource 112 to allow or deny access (or take some other action).

It is often the case, however, that non-local requestors 120a, 120b, 120n (collectively 120), may desire to access resources 112 of the domain 110. Similarly, operators of domains 110 wish to grant access to resources 112 of the domain 110 to these non-local requestors 120. However, operators (e.g., administrators, owners, etc.) of domains 110 do not wish to provide non-local requestors 120 with domain credentials (e.g., authentication information that can be authenticated by local domain authenticator 114). Nor do these operators of domains 110 wish to grant the non-local requestors 120 access to local domain authenticator 114 even in the case where credentials for resources 112 could be provided to a non-local requestor 120.

To facilitate access to resources 112 by non-local requestors 120 then, remote authenticator 116a, 116n (collectively 116) may be used. Specifically, when a request for a resource 112 is received from a non-local requestor 120, as the non-local requestor 120 has not been authenticated as member of the domain 110 (e.g., by local domain authenticator 114) and does not have domain credentials, the request will not contain any credentials that identify the non-local requestor 120 as a member of the domain 110. Thus, the request can be identified (e.g., by remote authenticator 116 or otherwise) as a non-local request for the particular resource 112.

In certain embodiments, a non-local requestor 120 may send a request to remote authenticator 116 to establish a secure communication channel. In particular, the request may be for an authentication service provided by remote authenticator 116 that can be used by non-local requestors 120 to obtain a credential for resources 122.

Remote authenticator 116 may, for example, include a SSH server. Remote authenticator 116 may be configured to verify a request sent to the authentication service. This verification may include verification that such a request it properly signed.

The remote authenticator 116 may also be configured to identify and respond to requests for authentication or a request for a credential. Such requests may be sent according to the format of the SSH protocol but contain data or field values not specified by the SSH protocol or that would not be recognized by a standard SSH server. Such requests may be sent according to the format of the SSH protocol but contain data or field values not specified by the SSH protocol or that would not be recognized by a typical SSH server. For example, such an authentication request may take the form of an authentication packet as defined by the SSH protocol but may specify a special authentication type. Similarly, a credential request may take the form of an SSH request packet with a special request for credentials. Remote authenticator is also configured to update session data 136 (e.g., maintained by the SSH server of the remote authenticator 116) with a flag or other indicator that the non-local requestor 120 associated with a session has been authenticated.

In such instances, remote authenticator 116 is configured to establish a secure communication channel with non-local requestor 120. The secure channel may utilize a publicly available protocol such as SSH employing the public key infrastructure (PKI). More specifically, each non-local requestor 120 may include one or more domain keys 122a, 122n (collectively 122), where each domain key 122 may be associated with, and may be provided by, a particular domain 110. For example, domain key 122a may be provided to non-local requestor 120a by domain 110a. Each domain key 122 provided to a different non-local requestor 120 from a particular domain 110 will be different. These domain keys 122 may be automatically (e.g., algorithmically) generated by domain 110 and provided to an operator of non-local requestor 120 (or otherwise provided) such that the domain key 122 provided to the non-local requestor 120 has a corresponding key that is accessible by remote authenticator 116. Such a domain key 122 may be, for example, a private key of a public/private key pair that is stored on the non-local requestor 120.

Accordingly, remote authenticator 116 may be configured to establish the secure communication channel with the non-local requestor 120 using the domain key 122 for that domain 110 held by the non-local requestor 120 and the corresponding (e.g., public) key accessible by remote authenticator 116. The secure channel may be accomplished, for example, using signed communications (e.g., the initial request for the resource 112 sent from the non-local requestor 120 or a subsequent communication). Thus, the secure communication channel may be a thought of as a secure, encrypted, authenticated tunnel.

In particular, in certain embodiments, non-local requestor 120 includes non-local requestor module 124a, 124b, 124n (collectively 124) which may, for example, include a typical SSH client. Non-local requestor module 124 may be configured to properly sign a request. The non-local requestor module 124 may also be configured to compose requests for authentication or a request for a credential to a domain 110 using the key 122 associated with that domain 110. Such requests may be sent according to the format of the SSH protocol but contain data or field values not specified by the SSH protocol or that would not be recognized by a typical SSH server. For example, such an authentication request may take the form of an authentication packet as defined by the SSH protocol but may specify a special authentication type. Similarly, a credential request may take the form of an SSH request packet with a special request for credentials.

The non-local requestor module 124 may also be configured to identify and process responses to such authentication or credential requests, including, for example extracting tokens or other credentials contained therein. For example, a response to an authentication request may be an authentication response of success while a response to a credential request may be a request success packet with an enclosed credential (e.g., token) that the non-local requestor module 124 may utilize to make subsequent requests to resources 112 of the domain 110 or which may be provided to another module (not shown) at the non-local requestor 120 to allow that module to make requests to the resources 112 of the domain 110.

A request for authentication that is sent to remote authenticator 116 may thus be signed by the non-local requestor 120 using the domain key 122 associated with the domain 110 to which the request is to be sent. Remote authenticator 116 can identify the request as a remote authentication request and authenticate the request by verifying the signature (e.g., that the request was signed using the domain key 122) using the corresponding public key associated with that domain key 122. This may be done, for example, using a SSH/PKI authentication or the like.

If the initial authentication request from the non-local requestor 120 to the remote authenticator 116 is verified, remote authenticator 116 may set a flag or other indicator in session data 136 corresponding to the non-local requestor 120 that indicates that remote authentication has been performed for the non-local requestor 122 associated with that session and such remote authentication is successful.

While not expressly depicted herein, it should be noted that there may be as many instances of a remote authenticator 116 per domain 110 as desired. These multiple instances of remote authenticator 116 may be used for a variety of reasons, including providing redundancy for fault tolerance, may be used for different resources 112 or to provide different levels of access to different resources 112, etc. Additionally, different keys (e.g., private/public key pairs) may be used with those multiple remote authenticators 116, even with respect to the same non-local requestor 120.

If the authentication request cannot be verified by remote authenticator 116, communication may cease and no access to resources 112 will be granted. If, however, the authentication request can be verified a second request from non-local requestor 120 may request a credential for use of resources 112 from remote authenticator 116. Remote authenticator 116 may identify the received request as a credential request and check session data 136 associated with the non-local requestor 120 to determine if that non-local requestor 120 has been authenticated by determining if the remote authentication flag is set in the session data 136 in association with a session for that non-local requestor 120.

Remote authenticator 116 may also be configured to communicate with local domain authenticator 114 to obtain a credential for resources 112. In some embodiments, the remote authenticator 116 may have a local domain account (e.g., credentials recognized by local domain authenticator 114) such that remote authenticator 116 may authenticate with the local domain authenticator 114 using this local domain account. Once remote authenticator 116 is authenticated with local domain authenticator 114, remote authenticator 116 may then request a credential (e.g., a single-use credential) from local domain authenticator 116.

A single-use credential may be provided based on the resource requested, the non-local requestor 120 who issued the request or almost any other desired criteria to ensure that the single-use credential grants a desired level of access to the non-local requestor 120. For example, the single-use credential may be restricted to a single session (e.g., a number of requests within a particular time period), may include only certain permissions (e.g., only read permissions or only the right to use certain functionality of a service, etc.). Other access control restrictions may be imagined.

The local domain authenticator 114 may record the credential (and if needed, any associated resource any access control restrictions) such that future access may be controlled using the credential. For example, the credential may expire after the session such that it can no longer be used to access any resources 112 of the domain, etc.

In some embodiments, a single-use credential may be a token (e.g., a signed token) that may be used in subsequent requests for the desired resource 112. This token may be the same type, or similar to, the type of token provided by local domain authenticator 114 to members of the domain 110. By utilizing a standard type of credential, the various resources 112 accessed using such credentials do not have to be configured to differentiate between requests from the non-local requestors 120 and requests from members of the domain 110 and such requests to resources 112 may take the same format, even though a separate authentication mechanism may be utilized by the two types of requestors.

Moreover, the non-local requestor 120 can utilize that credential in subsequent requests even though no user information or other data may be derived from that credential. In fact, as the credentials provided to non-local requestors 120 may be divorced from credentials provided to members of the domain (though they may be of the same type), such credentials may provide stronger security as it is not possible to actually be authenticated as a member of the domain even in cases where such credentials are intercepted, and it is not possible to use such credentials after the expiration of the session.

Once such a credential is provided to the remote authenticator 116 from the local domain authenticator 114, the remote authenticator 116 may provide the credential to the non-local requestor 120 which initiated the request over the secure communication channel (e.g., SSH) established with the non-local requestor 120. Accordingly, the credentials obtained by the remote authenticator 116 are tunneled over the secure communication channel established between the remote authenticator 116 and the non-local requestor module 124.

Subsequently the non-local requestor 120 may utilize the credential in conjunction with a request for the resource 112 and may be authenticated with the domain 110 (e.g., using the local domain authenticator 114) and access a resource 112 subject to any access control restrictions. For example, the credential may be provided in subsequent requests for a resource 112. As the credential may be of the same type as that used for members of the domain 110, access to the resource can be controlled by the local domain authenticator 114 in a similar manner to the manner in which access to the resource 112 by members of the domain 110 is controlled (e.g., through local domain authenticator 114).

In this manner, a non-local requestor 120 (or applications thereon) may be granted access to a requested resource 112 subject to conditions imposed and controlled by the domain 110 and without non-local requestor 120 being authenticated as a member of domain 110 or allowed to directly access local domain authenticator 116. In one embodiment, using such a credential the non-local requestor 120 can access a resource 112 of the domain 110 during a single session maintained between the non-local requestor 120 and the domain 110 using a single-use credential, and authentication of the non-local requestor 120 during the session is accomplished using the local domain authenticator 114.

Figure 2A:
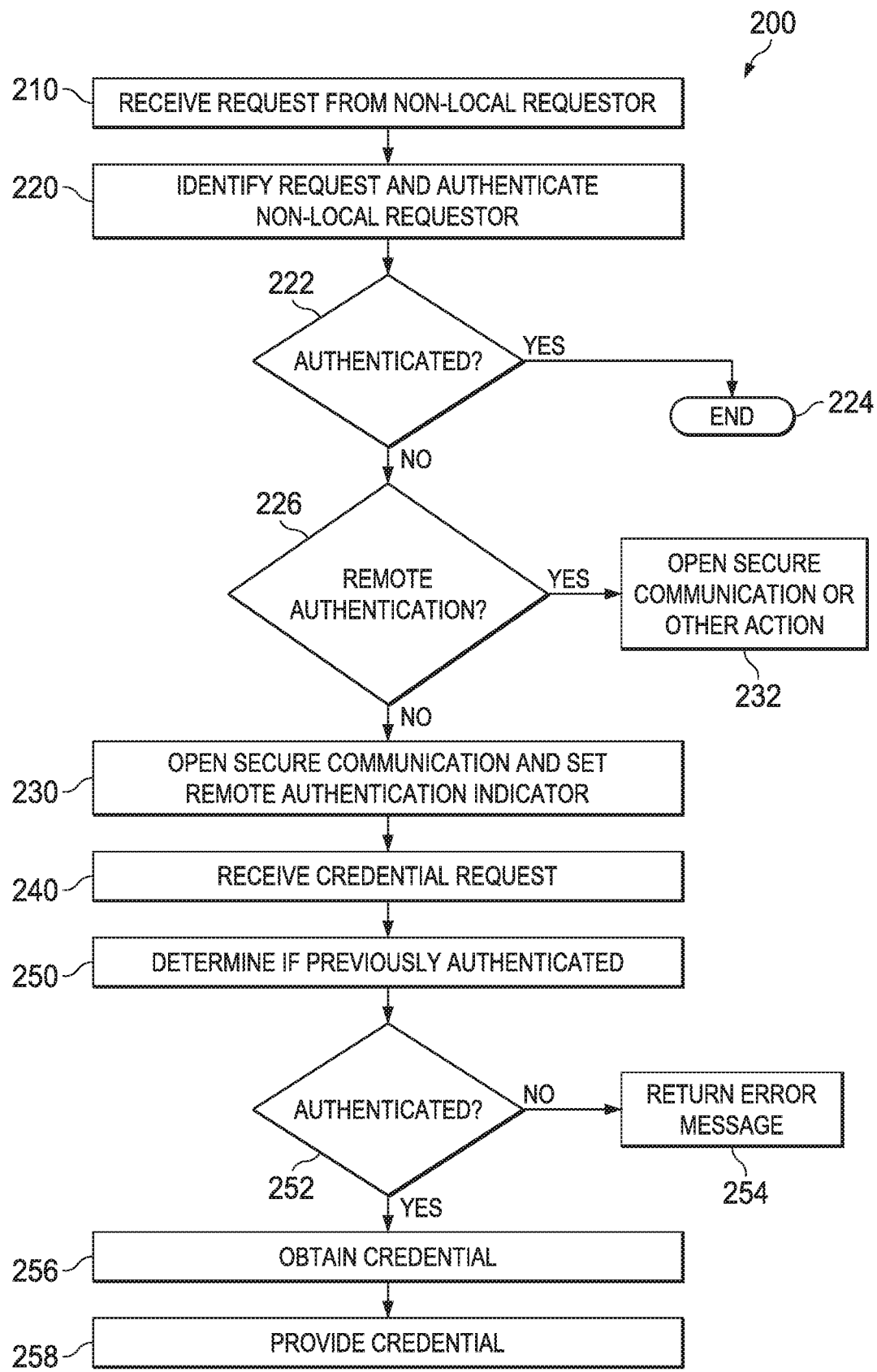
FIGS. 2A and 2B depict a flow diagram illustrating an embodiment of a method for authenticating a non-local requestor.
Figure 2B:
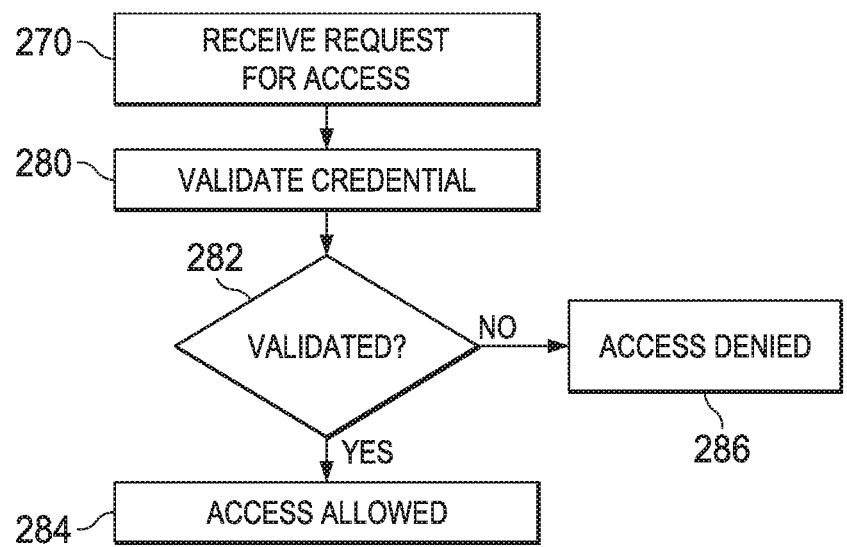

FIGS. 2A and 2B depict one embodiment of a method for allowing access to resources of a domain by non-local requestors using a remote authenticator and a credential. Initially, at step 210 a session or other connection may be established between a non-local requestor and the remote authenticator. This initial session or connection may, for example, be established by an SSH client at the non-local requestor and an SSH server of the remote authenticator that is a member of the domain. A request for authentication by the domain can then be received at the domain from a non-local requestor who is not a member of a domain. Such a request may be handled by the remote authenticator. This request may be an authentication request, such as an authentication request according to the SSH protocol, but may include an identifier not used by the SSH protocol identifying the request as an authentication request associated with a non-local requestor requesting credentials.

In one embodiment, the authentication request may be signed, or include a signature, created by the non-local requestor. This signature may be created using the private key of a public/private key pair established for the non-local requestor and the domain, where the private key is resident on the non-local requestor. In one particular embodiment, a first authentication request packet may be created. The first authentication request packet may include an indicator that a remote authentication is being requested. Additionally, the first authentication request packet including the session identifier for the session established between the non-local requestor and the remote authenticator (which may be the session key for the SSH connection between the non-local requestor and the remote authenticator of the domain) and a certificate associated with the non-local requestor. Such certificates are known in the art and are sometimes referred to as public key certificates, digital certificates or identity certificates. The private key of the non-local requestor may then be used to create a digital signature by hashing the first authentication request packet and encrypting the resulting hash value with the private key.

A second authentication request packet is then created, where the second authentication request packet includes an indicator that a remote authentication is being requested among other information. The digital signature created from the first authentication request packet can then be appended to, or included with, the second authentication request packet and this second authentication request packet sent to the domain by the non-local requestor.

At step 220, a request can be identified and the non-local requestor can be authenticated. Initially, the remote authenticator can identify the request as an authentication request associated with a non-local requestor requesting credentials based on the identifier in the request. The authentication may be performed by the remote authenticator of the domain using the authentication request received from the non-local requestor. Specifically, in embodiments where the authentication request is signed, the public key associated with the non-local requestor may be used to verify that the authentication request was signed using the private key of the non-local requestor. Such authentication may be done, for example, according to an implementation of SSH (e.g., which may be performed using PKI).

In particular, in certain embodiments, the authentication of the non-local requestor may utilize a second authentication request packet received from the non-local requestor. The certificate associated with the non-local requestor may be resident in the domain and accessible by the remote authenticator. The remote authenticator may utilize the public key associated with the certificate to decrypt the signature included in the second authentication request packet to yield the unencrypted contents of a first authentication request packet. The certificate contained in the first authentication request packet or the second authentication request packet and the contents of the first or second authentication request packet may be utilized to authenticate the non-local requestor. For example, this authentication may occur using public key authentication according to the SSH protocol.

If the non-local requestor cannot be authenticated at step 222 the method may end at step 224 and an error message or denial sent to the non-local requestor. If, however the non-local requestor can be authenticated at step 222 it can then be determined if the non-local requestor is requesting remote authentication as a non-local requestor at step 226.

In one embodiment, this determination may be made using the contents of the first authentication request packet or second authentication request packet. If there is an indicator in the first or second authentication request packet that remote authentication is being requested, a flag or other indicator may be set in session data associated with the non-local requestor indicating that the non-local requestor has been authenticated as a non-local requestor at step 230. This session data may, for example, be maintained by the SSH server of the remote authenticator. If there is no remote authentication indicator in the first or second remote authentication packet the secure connection (e.g., according to the SSH protocol) may be established without setting such a flag or another action may be taken, at step 232.

Once the non-local requestor is authenticated, at step 240 a request for a credential may be received. It will be noted here that while embodiments have been described with separate requests for authentication and a credential, these requests may be combined into a single request or more than two requests in other embodiments.

In one embodiment, the credential request may be an SSH request packet with an indicator indicating it is a request for credentials. At step 250 the remote authenticator of the domain may identify this request as a credential request and based on this credential request, determine if the non-local requestor from which the credential request was received has been previously authenticated. In one embodiment, the determination may be made by accessing session data associated with the session established with the non-local requestor and associated with the credential request. Specifically, in one embodiment, the remote authenticator may determine if there is a set flag or other indicator in the session data indicating the non-local requestor has been previously authenticated. If the non-local requestor has not been previously authenticated as determined at step 252 an error or denial message may be returned to the non-local requestor at step 254.

If the non-local requestor has been previously authenticated at step 252, the remote authenticator may communicate with a local domain authenticator for the domain to obtain a credential at step 256. In some embodiments, the remote authenticator may itself, authenticate with the local domain authenticator using a local domain account and only once the remote authenticator has itself been authenticated by the local domain authenticator will a credential for the requested resource be provided to the remote authenticator by the local domain authenticator.

In one embodiment, the credential may be a single-use credential. The single-use credential may be generated by the local domain authenticator at the time it is requested and may be based on a variety of factors, including the resource requested, the non-local requestor who issued the request or almost any other desired criteria to ensure that the single-use credential grants a desired level of access. For example, the single-use credential may be restricted to a single session or may be associated with only certain permissions (e.g., only read permissions or only the right to use certain functionality of a service, etc.). Other access control restrictions may be imagined. The local domain authenticator may generate and store the single-use credential or may select from a set of previously generated credentials for non-local requestors such that future access may be controlled using the single-use credential (and any associated access restrictions).

In some embodiments, the credential provided by the local domain authenticator may be a single-use credential and take the same form as any other token that may be issued by local domain authenticator (e.g., to members of the domain), or may of a different format than such tokens. In fact, in some embodiments, as the remote authenticator may have an account with the local domain authenticator, the local domain authenticator may issue the same type of token that is issued to members of the domain, where such a token may be good for a single session and allow access to all or some subset of the resources of the domain for the requestor.

At step 258 the credential may be provided to the non-local requestor over the secure communication channel. In certain embodiments, the credential may be provided in a SSH packet (e.g., a request success packet or the like) responsive to the received credential request. The secure communication channel can then be closed or otherwise dropped.

Turning now to FIG. 2B, at step 270, a resource of the domain may receive a request for access from the non-local requestor. The request may, for example, be a web service request or the like in cases where the resource provides a web service interface or may be a request for data where the resource is a data store presenting a data access interface, or may be another type of request. The request may include a credential (e.g., a single-use credential) previously provided to the non-local requestor.

At step 280 the resource may make an attempt to validate the credential received with the request to ensure the credential is valid by providing the credential to the local domain authenticator for the domain and receiving a response (e.g., that the credential is valid or invalid). If the credential is valid at step 282, access to the requested resource may be allowed at step 284 while if the single use credential is invalid at step 282 access to the requested resource may be denied or other action taken at step 286.

The validation of the credential may thus occur in the same, or a substantially similar, manner as the validation of any other token issued by local domain authenticator of the domain access a request a resource of the domain may be controlled using the credential. In other words, the non-local requestor may utilize the credential such that a request from the non-local requestor can be authenticated with the domain (e.g., using the local domain authenticator) and access the resource subject to any access control restrictions. Specifically, a request for the resource may be sent to the resource and the credential provided in conjunction with the request. Access to the resource can then be controlled by a local domain authenticator in a similar manner to the manner in which access to the resource by members of the domain is controlled.

In fact, in certain embodiments neither the resource which received the request nor the local domain authenticator requires any "awareness" that such a request was received from, or issued by, a non-local requestor. The interface provided by the requestor may be the same for any requestor and the validation of credentials received with such a request will be the same as with members of the domain. In this manner, no special modification, adaptation or code for either the resource or the local domain authenticator may be needed to allow access to resources of the domain by a non-local requestor.

As will be apparent, embodiments as have been discussed herein above may be applicable to a wide variety of architectures and distributed systems, including multi-tenanted architecture designed for access by many unaffiliated requestors and high scalability. However, it may be useful to an understanding of various embodiments to depict the application of one embodiment with respect to a particular architecture, in this case a managed file transfer setting. Managed file transfer ("MFT") refers to a solution for managing secure network data transfer from one computer to another over private and/or public networks, including the Internet. Embodiments of MFT are described in U.S. patent application Ser. No. 14/627,817, filed Feb. 20, 2015, entitled "Systems and Methods for Managed Data Transfer", by inventor Jonathan Carroll, hereby incorporated by reference in its entirety for all purposes. In some instances, such a solution is an enterprise class solution tailored to the needs and desires of an enterprise. Compared to ad-hoc file transfer solutions such as file transfer protocol ("FTP"), MFT provides a higher level of security and control over the payload as well as the transmission of large volumes of bulk data between entities.

MFT applications are available as either on-premises licensed software packages or off-premises software-as-a-service ("SaaS"). SaaS refers to a software delivery model where the software and associated data are hosted and accessible on a client device communicatively connected to a server machine in the cloud. In some instances, the software and associated data are hosted in the cloud and accessible by a user. The user may use a thin client and such a thin client may be integrated with a web browser executing on the client device. Cloud computing is a synonym for distributed computing over a network, a non-limiting example of which includes the Internet, and involves a number of computers connected through the network.

Figure 3:
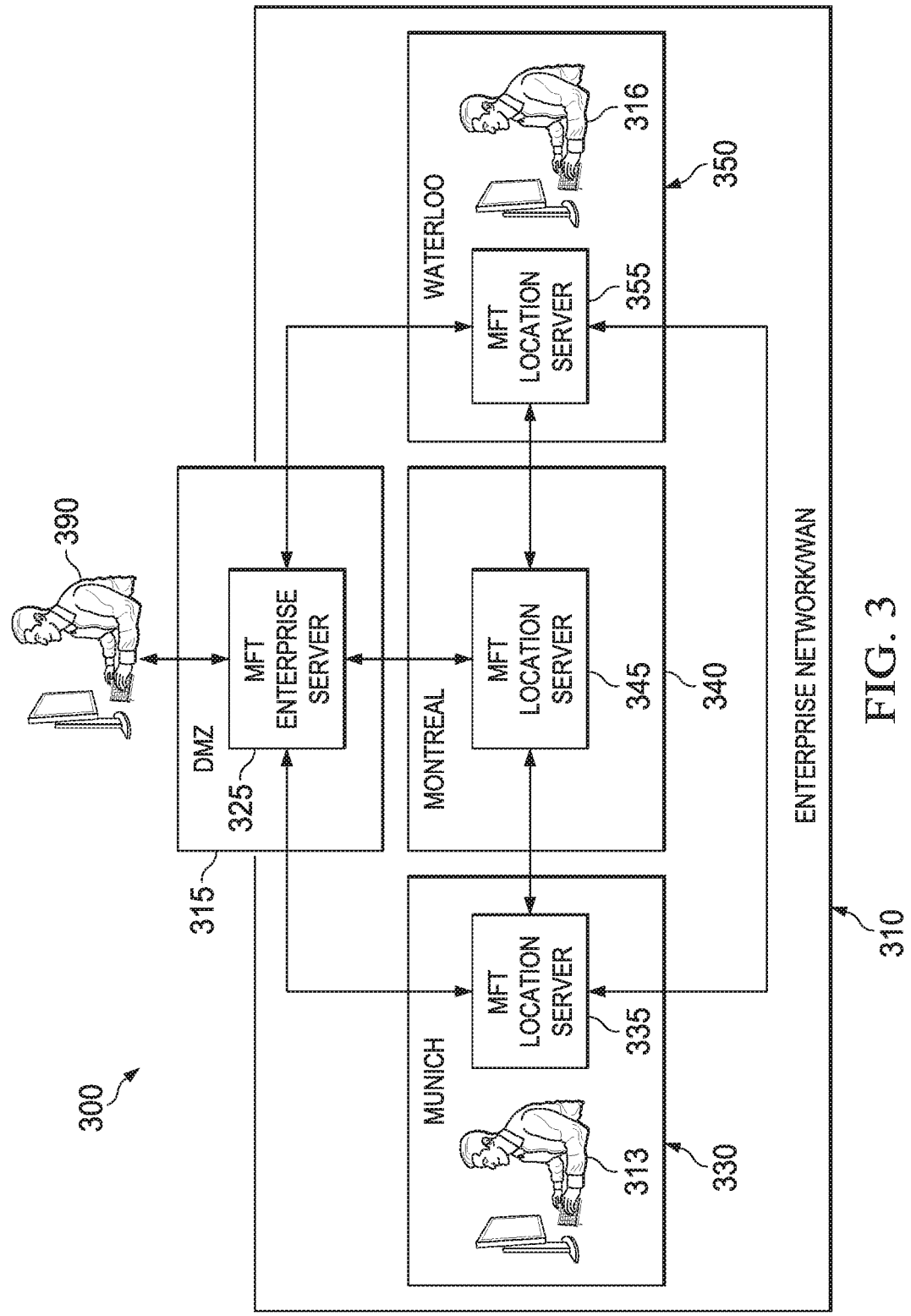
FIG. 3 depicts a diagrammatic representation of one embodiment of a data transfer system and architecture.

FIG. 3 depicts a diagrammatic representation of an example of an on-premises data transfer system and architecture. In this example, system 300 includes MFT enterprise server 325. Several MFT location servers 335, 345, and 355 are communicatively connected to MFT enterprise server 325 and to each other via enterprise network 310 which, in one embodiment, can be a LAN or a WAN. An MFT enterprise server has a number of components including an MFT web service, an MFT transfer server, a file server, a database server, and an authentication server. The MFT web service provides the frontend services to users such as setting up and tracking transactions. The transfer server takes care of the server (host) side of a file transfer. Other components such as user authentication, database, etc. are not relevant for the purpose of this disclosure.

Each MFT location server resides at a geographic location and can be said to serve a particular group of individuals, non-limiting examples of which include those proximate to the geographic location and/or are served by a location server at an organization's office or those who are members of a particular group. For example, MFT location server 335 may reside at first location 330 (in this example, Munich, Germany), MFT location server 345 may reside at second location 340 (Montreal, Canada), and MFT location server 355 may reside at third location 350 (Waterloo, Canada). An MFT location server may have an MFT transfer server and a file server, but may not have an MFT web service, a database server, or an authentication server. In a typical MFT setup, in either an on-premises or cloud version (see, e.g., FIG. 4), MFT location servers are a subset of a main MFT enterprise server because they have no web services or databases. MFT location servers are servers that can perform file transfers and that can be quickly added.

As illustrated in FIG. 3, MFT location servers 335, 345, and 355 are all behind (Demilitarized Zone) DMZ 315 of enterprise network 310. In computer security, a DMZ refers to a physical or logical sub-network that contains and exposes an enterprise's external-facing services to a larger, untrusted network such as the Internet. MFT enterprise server 325 connects MFT location servers 335, 345, and 355 to the outside world (e.g., the Internet) via DMZ 315.

If user 316, who is an employee of the enterprise at location 350 wants to send a large file to user 390 who is outside of enterprise network 310, that transfer will take place through MFT enterprise server 325 at DMZ 315 and then go outside to the world. Meanwhile, if employee 316 at location 350 wants to send a large file to employee 313 at location 330, it will be MFT location server 355 at location 350 taking that file from employee 315 at location 350 and forwarding it automatically to MFT location server 335 at location 330. MFT location server 335 at location 330 then forwards the file to employee 313 at location 330. In this case, the file itself does not have to go through DMZ 115.

In the on-premises setup shown in FIG. 3, the MFT location servers are "on location" (on a company's enterprise network), under control of an enterprise such as an information technology ("IT") department of a company. This means that they deal with one known set of users, run on a network that the enterprise controls, so the firewall is not an issue, since they are all within the purview and control of the IT department of the enterprise. However, since the MFT enterprise server is located inside the DMZ, setting up an on-premises MFT solution is a complex and complicated process. For example, the entity that offers the on-premises MFT solution often needs to involve network security and/or IT personnel from their enterprise customer to get the right port opened in the enterprise network's DMZ so the MFT enterprise server inside the DMZ can send data to and receive data from the outside world through the DMZ. On the other hand, the network security and/or IT personnel from the enterprise may not have the knowledge necessary to maintain the MFT enterprise server, which may result in repeated on-site visits to maintain/service the MFT enterprise server running inside the DMZ. Furthermore, some enterprises may not have the necessary resources to implement the on-premises MFT solution.

An off-premises MFT solution can avoid these issues by hosting MFT services in the cloud, thereby off-loading many of the technical setup, operational, and maintenance challenges to a hosting service. With the off-premises MFT solution, enterprises do not have to host an MFT enterprise server inside their DMZ and do not have to have any MFT location servers on their private network. They can avoid complicated setup in the DMZ, avoid getting network security and/or IT personnel involved in terms of getting the right port opened, avoid having to host transfers to outside people, etc.

Figure 4:
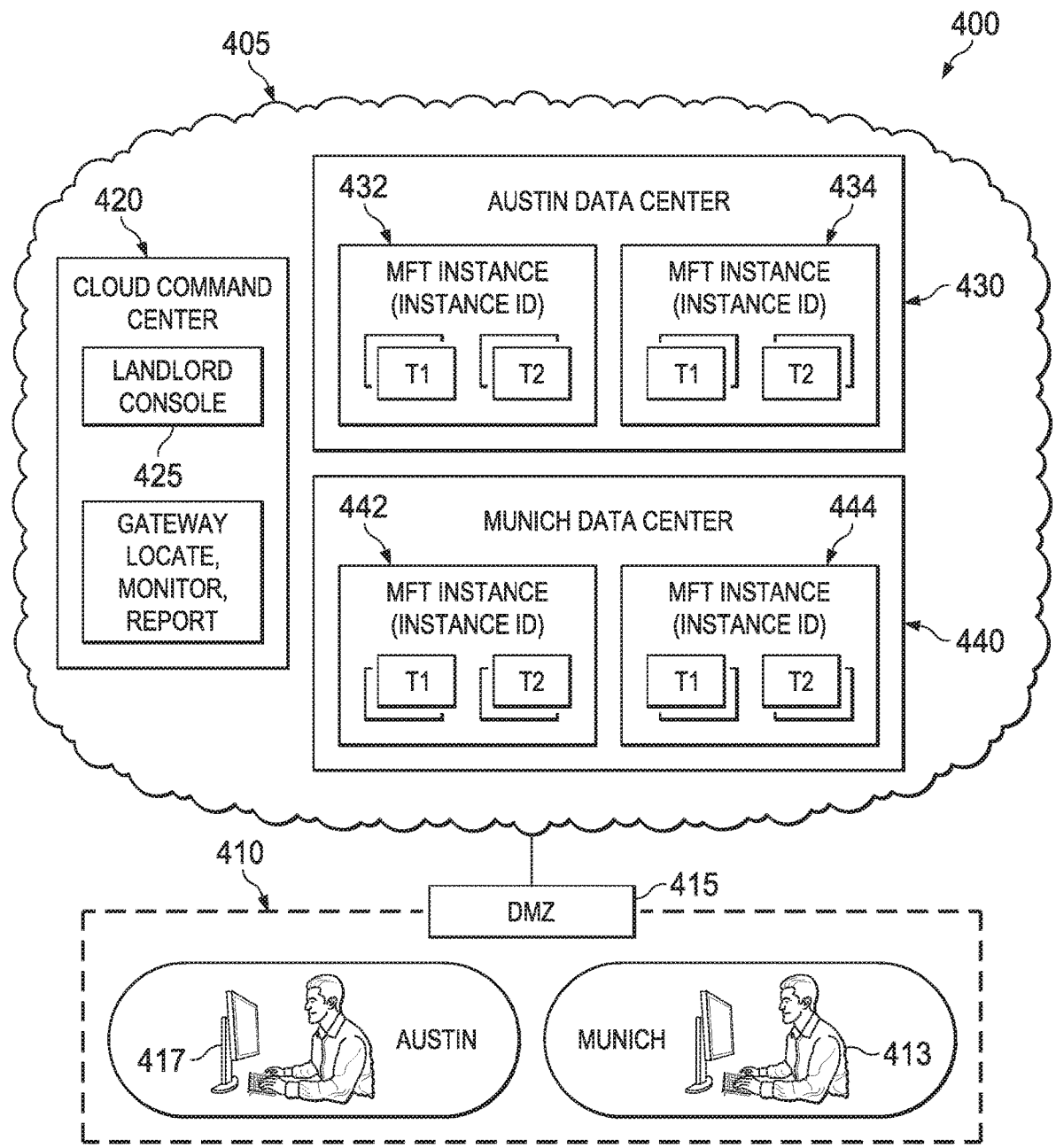
FIG. 4 depicts a diagrammatic representation of one embodiment of an off-premises data transfer system and architecture.

FIG. 4 depicts a diagrammatic representation of an example of an off-premises data transfer system and architecture. In this example, system 400 includes cloud 405 providing data transfer services to employees 417, 413 in enterprise network 410 via DMZ 415. In physical terms, cloud 405 is made of command center 420 (e.g., also referred to as a cloud command center) and data centers 430, 440. Command center 420 may reside in data center 430, data center 440, or another data center or server machine.

As those skilled in the art will appreciate, cloud 405 is configured for multi-tenancy. In cloud computing, multi-tenancy refers to a principle in software architecture in which a single instance of the software runs on a server to serve multiple client-organizations (tenants). In the example shown in FIG. 4, data center 430 has MFT instances 432, 434 running and data center 440 has MFT instances 442, 444 running. Command center 420 may have landlord console 425 running to serve multiple client organizations (tenants). Each MFT instance can have one or more tenants and can be thought of as an MFT enterprise server described above. In the example shown in FIG. 4, each MFT instance has two tenants T1, T2.

These tenants are customers (e.g., businesses, companies, enterprises, corporations, organizations, etc.) who purchased or subscribed to MFT services from the cloud operator of cloud 405 and got on-boarded to an MFT server in cloud 405. Many of the tenants can be on-boarded to the same physical server. The physical make up and configuration of server machines in cloud 405 are transparent to the tenants.

In FIG. 4, the entity that owns enterprise network 410 may be tenant T1 or tenant T2. Because everything runs in cloud 405, no MFT components run on the entity's premises. All file transfers go through DMZ 415 and are performed by MFT servers sitting in cloud 405. If employee 417 wants to make a file transfer to employee 413, that transfer will begin by employee 417 sending a file from a computer on enterprise network 410 to cloud 405. Employee 413 will receive the file through cloud 405 (via the MFT instance hosting the entity's MFT service) and back to enterprise network 410 again.

This off-premises, cloud based MFT solution is advantageous for handling data transfers that take place between people who are not on-premises. However, as the above example illustrates, the off-premises MFT solution can lose some efficiency as compared to the on-premises MFT solution described above with reference to FIG. 3. For example, because there are no MFT location servers within an MFT tenant's private network, each file transfer must take place through the cloud, even if both the sender and the recipient are on the same MFT tenant's private network.

Embodiments provide a hybrid on-premises/off-premises MFT solution that can take advantage of the benefits and features of both the on-premises MFT solution and the off-premises MFT solution. In a hybrid on-premises/off-premises MFT solution, some MFT components are located on-premises and some are hosted in the cloud.

Figure 5:
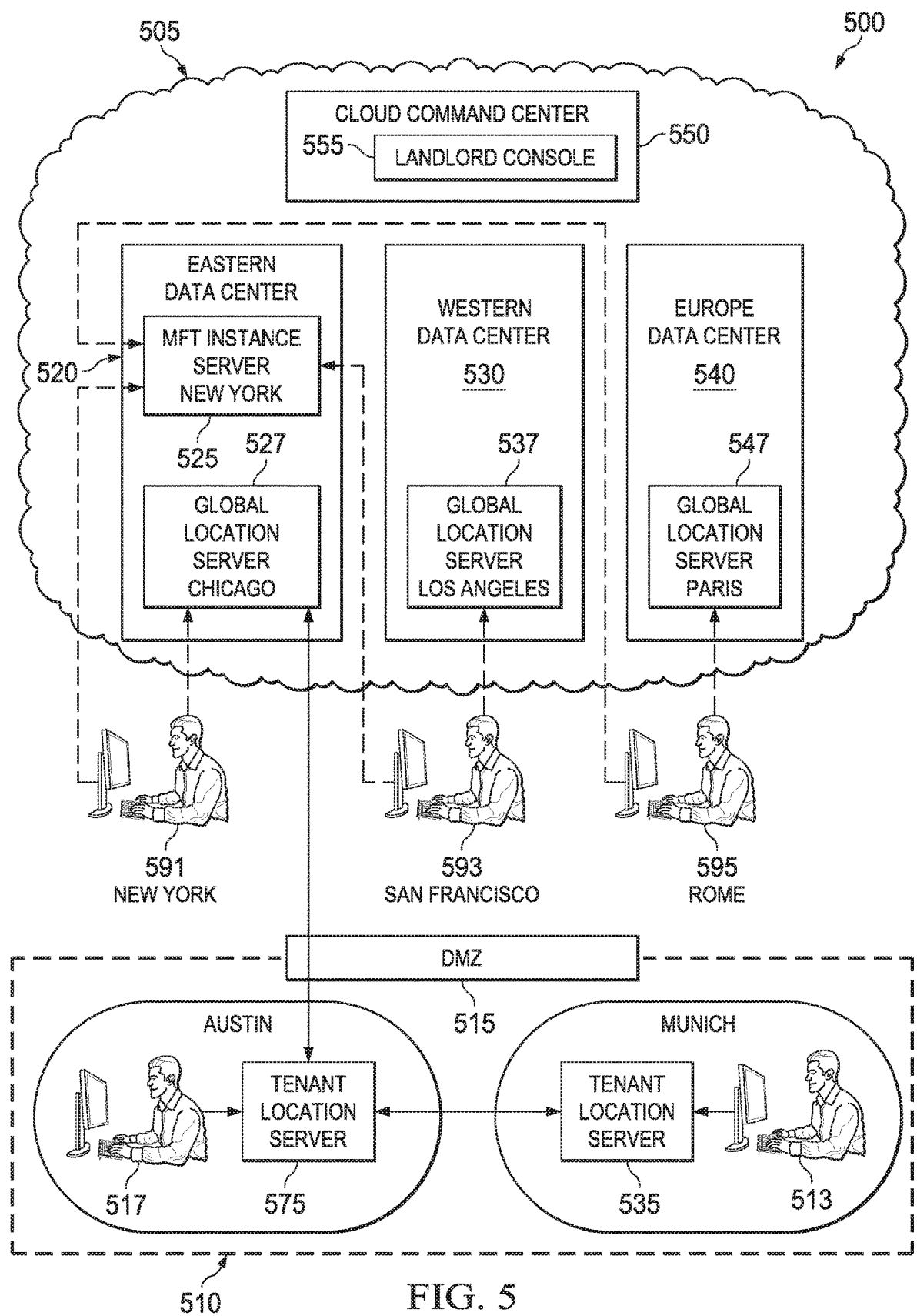
FIG. 5 depicts a diagrammatic representation of one embodiment of a data transfer system and architecture.

In the example of FIG. 5, system 500 comprises data centers 520, 530, and 540 hosted in cloud 505. These data centers are physically located remote from one another. As illustrated in FIG. 5, in some cases, data centers may be located across continents. Each data center may comprise a location server which is hosted in cloud 505 and thus off-premises of any customer's private network. These off-premises location servers may be referred to as global location servers. In this example, data center 520 may comprise global location server 527, data center 530 may comprise global location server 537, and data center 540 may comprise global location server 547. Eastern data center 520 may further comprise MFT instance 525 which, in this example, executes on a server machine located in New York, while global location server 527 is located in Chicago.

On-premises location servers installed inside a customer's private network may be referred to as tenant location servers. Such a private network may be a WAN or a LAN. As illustrated in FIG. 5 tenant location servers 375, 335 may reside in enterprise network 510, behind DMZ 515. However, unlike the on-premises MFT solution illustrated in FIG. 3, there is not an MFT enterprise server inside DMZ 515.

For the purpose of illustration and not of limitation, FIG. 5 shows a single tenant's enterprise network 510. However, as those skilled in the art will appreciate, cloud 505 may serve multiple tenants. Further, each data center may separately run an MFT instance hosting multiple tenants, as described above with reference to FIG. 4. Cloud command center 550 may run landlord console 555 to serve these tenants.

Architecturally, a hybrid on-premises/off-premises solution for an individual tenant may comprise off-premises MFT components and on-premises MFT components. In some embodiments, a hybrid on-premises/off-premises solution for an individual tenant may comprise a single MFT instance and at least one global location server hosted in the cloud, and at least one tenant location server within a private network.

User 517 and user 513 may work for the entity that owns enterprise network 510. Suppose user 517 who is in Austin, Tex., U.S.A. wants to transfer a file to user 513 who is in Munich, Germany. In an example implementation that did not include on-premises tenant location servers 575, 535, the file would have to transfer from a computer of user 517 inside enterprise network 510, to an external off-premises location server on the Internet through DMZ 515 and stored in the cloud. User 513 would have to download the file from that cloud storage location which would tend to be closer to either user 517 or user 513. If user 513 downloaded the stored filed from a US-based data center closer to user 517 (such as data center 520 or 530), user 513 will likely experience longer transfer times because of the distance between the US-based data centers and Germany. The reverse would be true if the file were transferred to a European data center for storage (such as data center 540).

In contrast, in the hybrid topology, location servers are installed on-premises and may be referred to as tenant location servers, as described above. Operationally, when user 517 wants to send files to user 513, tenant location servers (575, 535) can be involved in transferring the files such that tenant location server 575 transfers files to tenant location server 535 closer to user 513. Such a file transfer takes place entirely within the enterprise network 510, without the need for off-premises location servers. In this way, more generally, the hybrid topology can be said to reduce file transfer time for on-premises users, at least once the file is transferred to a tenant location server servicing a user.

Figure 6:
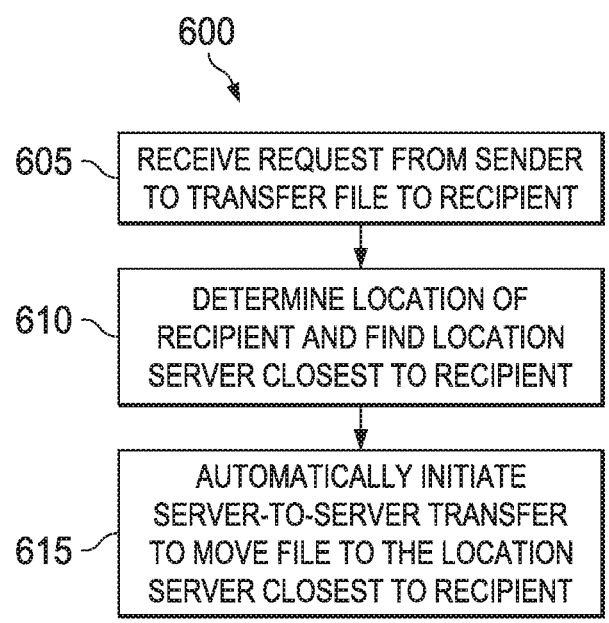
FIG. 6 depicts a flow diagram of one embodiment of a method for data transfer.

This is further described below with reference to FIG. 6, which depicts a flow diagram illustrating an example of a method for hybrid on-premises/off-premises data transfer. As a specific example of method 600 of FIG. 6, user 517 (sender) may send a request to cloud 505 to transfer a file to user 513 (recipient). In step 605, the request may be received by MFT instance 525 which runs an MFT web service for enterprise network 510. The file itself (bulk data) is uploaded from a computer of user 517 to tenant location server 575 inside enterprise network 510, out to the Internet through DMZ 515, to global location server 527 which is located in Chicago and which is the closest to user 517.

In step 610, MFT instance 525 may determine a location of user 513 and find a location server that is the closest to user 513. In step 615, MFT instance 525 may automatically initiate a server-to-server transfer to move the file to the location server that is the closest to user 313 and the location server then notifies user 313 that a file is waiting for him. The determination as to what constitutes the "closest" location server may be influenced by whether a pull operation or a push operation is to be used. For example, if a push operation is used, tenant location server 535 may be considered as the closest location server to user 513 and the file is "pushed" through DMZ 515 to tenant location server 535. In some cases, it may be easier to traverse a DMZ via a pull operation. If so, global location server 547 which is located in Paris, France, may be considered as the closest location server to user 513 who is in Munich, Germany. Thus, in this case, the file is moved to global location server 547; MFT instance 525 notifies tenant location server 535 of the requested transfer to user 513 and where the file is located (on global location server 547); and tenant location server 535 then notifies user 513 that a file is waiting for him.

In some embodiments, users and location servers can be located via network addresses or ranges of network addresses such as Internet Protocol ("IP") addresses. In some embodiments, moving files closer to the recipients may significantly improve the performance of large file transfers. In some embodiments, moving files closer to the recipients may allow the transfers to leverage high speed LANs instead of WANs. In some embodiments, transfers among users within a private network can be incorporated in one or more rules. Examples of rules may include "if a server is defined for a user, that location server will be used for that user"; "if the IP address of a sender is defined, use a location server that corresponds to the sender"; and "if the IP address of a sender is not defined, use geo-location to find the nearest location server." These rules may be applied in order.

Users outside of an enterprise network may also utilize the hybrid on-premises/off-premises solution to send and receive large files to and from users inside of the enterprise network. For example, user 591 in Chicago, user 593 in San Francisco, and user 595 in Rome may be business partners, suppliers, service providers, etc. who communicate with users 513, 517 inside of enterprise network 510. Suppose user 595 wishes to send a large file to user 517 and sends a request to cloud 505. The file is uploaded to the location server that is the closest to user 595 which, in this case, is global location server 547 in data center 540. The request from user 595 is received by MFT instance 525 hosted in cloud 505. MFT instance 525 may authenticate user 595 and determine that user 595 is in Rome and that the file is stored on global location server 547 in data center 540. Since users outside of enterprise network 510 may not have defined IP addresses, MFT instance 525 may determine their locations using a geo-locating methodology. MFT instance 525 may further determine that the intended recipient, user 517, is located in Austin and that the file should be moved to global location server 527. MFT instance 525 may then initiate a server-to-server transfer operation to transfer the file from global location server 547 in data center 540, to global location server 537 in data center 530, to global location server 527 in data center 525. MFT instance 525 may further notify user 517 that a file is waiting to be downloaded. User 517 may authenticate with MFT instance 525 hosted in cloud 505 and download the file from global location server 527, via DMZ 515 and tenant location server 575 in enterprise network 510.

With further reference to FIG. 5, different file transfers may occur across a hybrid on-premises/off-premises MFT system 500 depending on the relative location of users (517, 513, 591, 593, 595), makeup of data centers 520/530/540, MFT server 525, location servers 575/535/527/537/547, and whether users and location servers are on-premises (i.e., on internal network 510) or off-premises (i.e., on external network 505). In file transfer from on-premises sender 517 to on-premises recipient 513, MFT instance 525 determines the appropriate location server for sender 517 as tenant location server 575 and the appropriate location server for recipient 513 as tenant location server 535. As described herein above, MFT instance server 525 can use one or more approaches to determining the appropriate location servers for users.

In one embodiment, the appropriate location servers for users are predefined in a list which the MFT instance server 525 accesses. In another embodiment, a range of network addresses handled by each location server is maintained. The MFT instance server 525 determines whether a network address of a user's computer is within the range of network addresses of one of the location servers. If so, the location server is determined to be the location server for handling file transfers for the user. In yet another embodiment, location servers and users are geo-located. The location server closest to the user's location is determined to be the location server for handling file transfers for the user.

The MFT instance server 525 initiates a file transfer from user 517 to tenant location server 575 and a file transfer from tenant location server 575 to tenant location server 535. User 513 may be notified that the file is ready for download. As part of the file transfer process, MFT instance server 525 may require authentication by either one or both users 517, 513, for security purposes and/or to ensure proper application of rules and policies governing file transfers, information retention, and data properties.

Hybrid on-premises/off-premises MFT system 500 handles another type of file transfer in which on-premises sender user 517 transfers a file to an off-premises recipient user 591. Here, using one of the aforementioned approaches for determining appropriate location servers, the MFT instance server 525 initiates a file transfer from user 517 to tenant location server 575. MFT instance server 525 then initiates a transfer from tenant location server 575 to global location server 527 assigned to service off-premises user 591. User 591 may then download the file from global location server 527.

Hybrid on-premises/off-premises MFT system 500 handles yet another type of file transfer in which on-premises sender user 517 transfers a file to an off-premises recipient user 595. Here, the MFT instance server 525 initiates a file transfer from user 517 to tenant location server 575. In this instance, MFT instance server 525 determines that no direct connection exists between tenant location server 575 and global location server 547 assigned to user 595 in Rome. However, MFT instance server 525 determines that global location sever 527 can serve as an intermediary between tenant location server 575 and global location server 547. MFT instance server 525 then initiates a transfer from tenant location server 575 to global location server 527 and then from server 527 to global location server 547. User 595 may then download the file from global location server 547.

In another embodiment, hybrid on-premises/off-premises MFT system 500 handles another type of file transfer in which off-premises sender user 591 transfers a file to off-premises recipient user 593. Here, the MFT instance server 525 may use the geo-location approach to assign user 591 to global location server 527 and may assign user 593 to global location server 537 based on the fact that the user's network address is within the range of network address's handled by server 537. The MFT instance server 525 transfers the file from the computer of user 591 to server 547 and then from server 547 to server 537.

In a further embodiment, hybrid on-premises/off-premises MFT system 500 handles another type of file transfer between an off-premises sender user 591 and on-premises recipient user 517. Here, for security reasons, it may not be desirable to transfer the file from an off-premises public network 505 to an on-premises private network 510. For example, hackers may be able to infiltrate private network 510 and pass on viruses to the organization's network if such a file transfer were allowed without further precautions and/or mechanisms to thwart and prevent such attacks. To solve this problem, the file is pulled from the public network 505 to the private network 510. Here, the MFT instance server initiates the file transfer to global location server 527, but does not initiate the transfer to on-premises tenant location server 575. Instead, the tenant location server 575 requests the file from the server 527. In some embodiments, the MFT instance server may send a request to the tenant location server 575 to download the file. In response, the tenant location server 575 initiates a request to download the file from server 527. In further embodiments, tenant location server 575 may require user 517 to authenticate with the transfer system 500 as an added security precaution.

As discussed, embodiments of an MFT system may be cloud based and multi-tenanted. In such cases, components of such a system may be designed to serve multiple clients. Specifically of interest to this example, in some cases each MFT instance at a data center as discussed may runs on a server to serve multiple client-organizations. For a variety of reasons in such a MFT architecture it may be desired that each MFT instance may have its own authenticator. By architecting the MFT instance in this manner scalability and performance may be enhanced, however, such architecture may cause some problems. For example, it may be the case that the command center needs to communicate with the MFT instances within the datacenters of the MFT system to request particular services required of those instances (e.g., file transfer services, administrative services, or the like). Cloud command center may, however, not be configured to be a member of the same domain as any MFT instance (e.g., it may be architecturally separated and not have domain credentials to be authenticated of as a member of the same domain as any MFT instance). A cloud command center may need, however, have the ability to access resources (e.g., services) local to those MFT instances to implement such a cloud base system. It is here, among other places, where embodiments of allowing access to non-local requestors as described herein may be useful to allow the cloud command center to access resources of an MFT data center as a non-local requestor.

Figure 7:
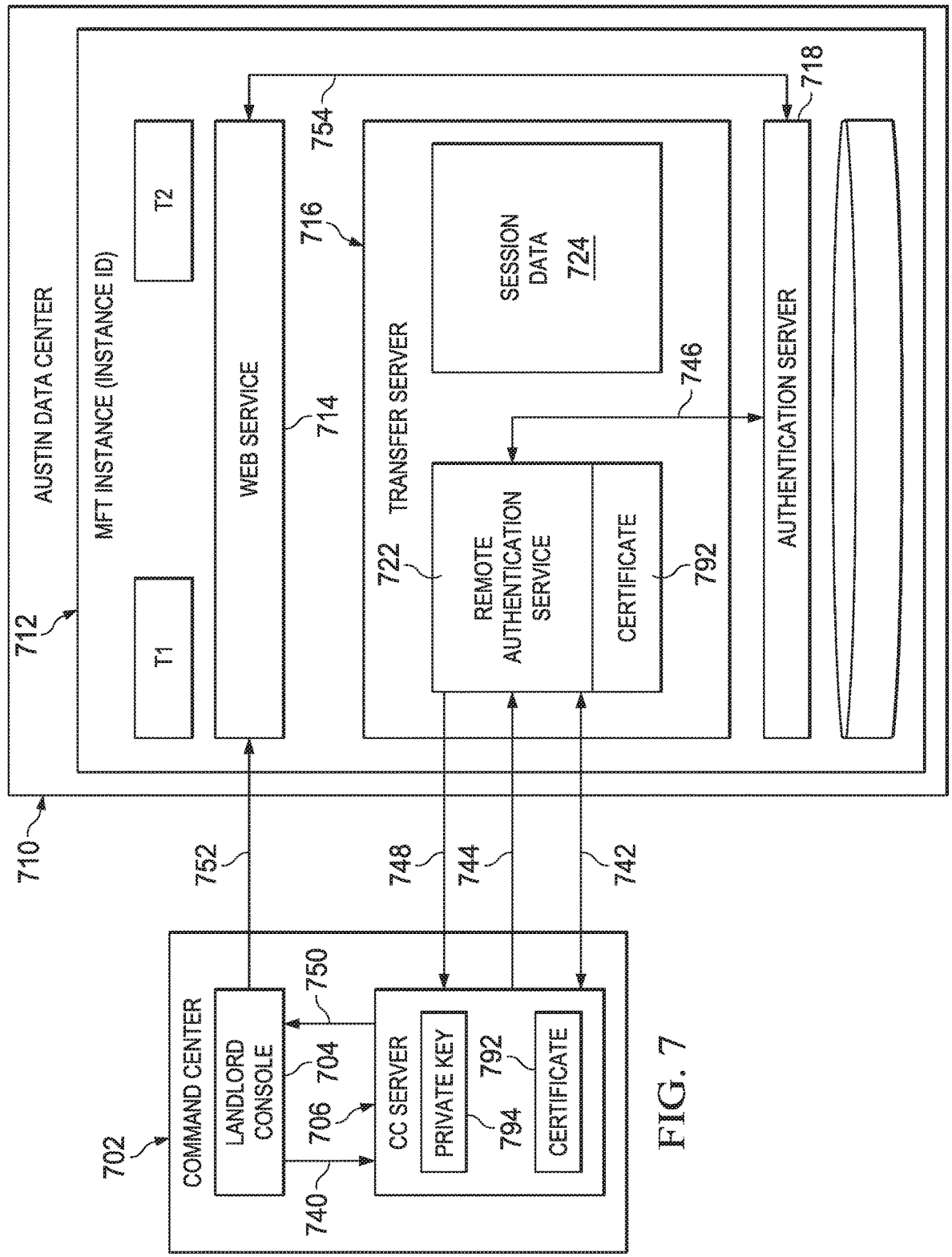
FIG. 7 depicts a diagrammatic representation of one embodiment an architecture and flow for authenticating a non-local requestor in a data transfer architecture.

An embodiment of allowing a command center access to resources of the domain of an MFT instance as a non-local requestor is depicted in FIG. 7. Command center 702 may include landlord console 704 and command center (CC) server 706. CC 702 may have an associated public key certificate 792 that may be accessible by the CC server 706 along with the private key 794 corresponding to that certificate 792. CC server 706 may include an embodiment of a non-local requestor module as described above, and is configured to send and receive certain requests and responses for CC 702, including certain requests from landlord console 704.

Specifically, in one embodiment, CC server 706 may be a server configured to service requests from the landlord console 704 and perform accesses or other communications required to service those requests from the landlord console 704. The landlord console 704 may include an interface (e.g., web based interface or the like) that allows administrators or other users to access certain functionality in conjunction with MFT instance 712. For example, such functionality may include the provisioning of new tenants (or configuration thereof) in MFT instance 712, access to file transfer services, other administrative functions, etc.

MFT instance 712 in a data center 710 may serve multiple tenants (e.g., T1, T2) and include web service module 714, transfer server 716 and authentication server 718. In some cases, part of the functionality offered to users through landlord console 704 may be implemented with respect to MFT instance 712 using resources of MFT instance 712, including for example, web services 714. Thus, landlord console 704 may need to access web services 714 (e.g., a resource) of MFT instance 712. For a variety of reasons, however, including architectural, regulatory, geographical or legal concerns, landlord console 704 and CC 702 are not members of the domain that includes MFT instance 712. In such embodiments of an MFT system then, landlord console 704 may need to be granted access to resources of MFT instance 712 as a non-local requestor. Embodiments as disclosed herein may thus be utilized to grant such access to landlord console 704. In specific embodiments where such authentication and access are utilized with a landlord console 704 such authentication and access may be referred to as landlord authentication.

In particular, in some embodiments transfer server 716 may provide a host of functionality through available interfaces or services, including various file transfer services or protocol implementations. Transfer server 716 may also provide remote authentication service 722 configured as an embodiment of a remote authenticator as described above. Thus, remote authentication service 722 may maintain session data 724 and have access to the public certificate 792 of CC 702. Authentication server 718 may be a server that implements an embodiment of a local authenticator, as discussed above, for members of the domain of MFT instance 712.

Accordingly, when certain functionality is accessed at landlord console 704 by a user (e.g., administrative functions associated with MFT instance 712), and landlord console 704 needs to access a web service 714 of the MFT to implement such functionality, landlord console 704 may send a request (STEP 740) to CC server 706 indicating that it needs a credential to access MFT instance 712. In one particular embodiment, in cases where different types of credentials may be obtained as a non-local requestor, the landlord console 704 may indicate that it needs a particular type of credential.

Upon receiving this request from the landlord console 704 the CC server 706 may establish a secure connection such as SSH connection with the remote authentication service 722 of transfer server 716 and send an authentication request to the remote authentication service 722 (STEP 742). This authentication request may be an SSH authentication packet with an indication that the authentication method to utilize is for authentication of the landlord console 704 as a non-local requestor.

In particular, in one embodiment CC server 706 may construct a first authentication request packet with the following:
SessionID
SSH2_MSG_USERAUTH_REQUEST
username
"ssh-connection"
"landlord_authenticaiton@opentext.com"
"1"
"ssh-rsa"
certificate
where the Session is the session key of the SSH connection between the CC server 704 and the remote authentication service 722, and the certificate is the binary version of certificate 792.

This packet may be signed (e.g., hashed and encrypted) using the private key 794 associated with certificate 792. The resulting signature may be included in a second authentication packet that includes the following:
SSH2_MSG_USERAUTH_REQUEST
username
"ssh-connection"
"landlord_authenticaiton@opentext.com"
"1"
"ssh-rsa"
Certificate
Signature
where the signature is the signed first authentication request packet.

As can be seen, then, in this embodiment the indicator that the authentication request packet is an authentication request packet requesting authentication as a non-local requestor may be the authentication method "landlord_authenticaiton@opentext.com", which is not a typical SSH authentication method. It will be noted that the authentication indicator may almost any value desired as long as it is not an authentication indicator (e.g., authentication method) specified by the SSH protocol.

The remote authentication service 722 may receive this authentication request (STEP 742) and determine that the authentication request is a request for authentication of the landlord console 704 as a non-local requestor. This determination can be made, for example, based on the indicator contained in the authentication request. Again, in one embodiment, the indicator "landlord_authenticaiton@opentext.com" contained in the authentication request packet may indicate that such an authentication is being requested. Additionally, authentication of the received authentication request may be performed. In one embodiment, this authentication may be standard certificate authentication as performed by the SSH protocol.

Note that in embodiments the username in the authentication request may be ignored. Since authentication of landlord console 704 is being performed, the normal repositories for user certificates (e.g., as used by SSH) may not be accessed—instead certificate 792 of CC 702 may be used.

If the authentication request from the CC server 706 can be authenticated remote authentication service 722 sets session data 724 to reflect the authentication. Specifically, in one embodiment, remote authentication service 722 may set a flag or other indicator in session data 724 (e.g., data associated with the session of the SSH connection between CC server 706 and remote authentication server 722) that indicates that that landlord authentication has been performed.

Note here that for this embodiment such authentication (e.g., landlord authentication) may only happen for certificate 792 held on CC 702 and specific to CC 702. Authentication in this embodiment may thus be successful only if both remote authentication service 722 and CC Server 706 have the same certificate 792 and the remote authentication service 722 receives a signature that can be decrypted and validated by the public key contained in that certificate.

If the authentication request can be authenticated by remote authentication service 722, the remote authentication service 722 may compose an SSH Authentication SUCCESS reply (e.g., SSH2_USERAUTH_SUCCESS packet) and reply to the CC Server 706 with the SUCCESS packet (STEP 742). It will be noted that, in one embodiment, remote authentication service 722 may sign the SUCCESS reply using a private key associated with a public key certificate (not shown) associated with the data center 710. CC Server 706 can then verify the reply message is from the data center 710 using the public key certificate associate with data center 710. In this manner both CC 702 and data center 710 (or components thereof) may be verified.

Once CC server 706 receives an authentication SUCCESS reply from the remote authentication service 722 the CC server 706 may send a credential request to the remote authentication service 722 (STEP 744). This authentication request may be an SSH request packet with an indication that the request is for credentials for landlord console 704 as a non-local requestor.

In particular, in one embodiment CC server 706 may construct a request packet with the following:
S5H2_MSG_GLOBAL_REQUEST
"getLandlordCredentials@opentext.com"
username
"1"

In this embodiment the indicator that the request is a credential request requesting a credential as a non-local requestor may be the indicator "getLandlordCredentials @opentext.com", which is not a typical SSH request. It will be noted that the credential indicator may almost any value desired.

The remote authentication service 722 may receive this request (STEP 744) and determine that that request is a request for credentials for a non-local requestor. This determination can be made, for example, based on the indicator contained in the credential request. Again, in one embodiment, the indicator "getLandlordCredentials@opentext.com" contained in the request packet may indicate that a credential is being requested.

When the request is identified as a credential request the remote authentication service 722 may access session data 724 to determine if authentication has been performed in that session. This determination can be made based on a flag or other indicator stored in session data 724 in association with the session in which the credential request was received.

The credential request will be failed if such authentication has not occurred and a FAILURE message sent back to CC Server 706. If, however, it is determined that landlord authentication has occurred for the session, the remote authentication service 722 may request a credential from authentication server 718 (STEP 746). In particular, the remote authentication service 722 may have a local account with authentication server 718. This account may be, for example, the same type of account that other members of the data center 710 have to authenticate with authentication server 718. In one particular embodiment, such an account may have administrative privileges within data center 710. The remote authentication service 722 thus uses this local account to acquire a credential, such as a token, from authentication server 718 which provides the credential in response to a local authentication performed by authentication server 718 for that local account. In this manner, the credential provided by authentication server 718 to remote authentication service 722 may be exactly the same type of credential authentication server 718 would be provided to an authenticated member of the data center 710.

Once the remote authentication service 722 has acquired the credential from the authentication server 718 it may return the credential to the CC server 706 (STEP 748). In one embodiment, a reply including a request SUCCESS packet may be returned that include the credential. In particular, in one embodiment remote authentication service 722 may construct a SUCCESS reply packet with the following:
S5H2_MSG_GLOBAL_REQUEST_SUCCESS
token
where token is the credential obtained from the authentication server 718.

When CC server 706 receives this reply it can extract the credential (e.g., token) from the reply and provide it to the landlord console 704 in reply to the landlord console's initial request (STEP 750). Upon receiving the credential the landlord console 704 may access resources of instance 712 using the credential (STEP 752). Specifically, in embodiments, landlord console 704 may utilize web services 714 to perform tasks (e.g., information retrieval, setting up a new tenant, deleting a partition, etc.) and provide the credential in requests to these web services 714. These requests may be sent directly to web service 714 in an identical or substantially similar manner to how members of the domain of instance 712 send requests to web service 714. Moreover, web service 714 may authenticate such requests as if the requestor (e.g., landlord console 704) was a member of the local authentication domain of instance 712. Specifically, web service 714 may authenticate the received credential using local authentication server 718, where the credential is the same format as the credentials utilized for members of the domain and the authentication server 718 is the same as would be utilized for requests received from members of that domain (STEP 754).

Those skilled in the relevant art will appreciate that the invention can be implemented or practiced with other computer system configurations, including without limitation multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. As one skilled in the art can appreciate, a computer program product implementing an embodiment disclosed herein may comprise one or more non-transitory computer readable media storing computer instructions translatable by one or more processors in a computing environment.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system, comprising:
   a domain, including:
      a processor;
      a set of resources;
      a non-transitory computer readable medium comprising instructions for a local domain authenticator and a remote authenticator;
   the local domain authenticator for:
      providing a credential for a member of the domain to use in accessing the set of resources of the domain during a session,
      authenticating the credential associated with a member of the domain, and
   a remote authenticator, for:
      providing the credential to a non-local requestor which is not a member of the domain by:
      receiving an authentication request from the non-local requestor outside the domain, wherein the request is a request to be authenticated for accessing the set of resources,
      authenticating the non-local requestor using the authentication request utilizing a secure channel established with the non-local requestor based on a unique identifier associated with both that domain and the non-local requestor,
      accessing the local domain authenticator to obtain the credential associated with the domain, and
      providing the credential to the non-local requestor, wherein the non-local requestor can access the set of resources of the domain during the session maintained between the non-local requestor and the domain using the credential, and authentication of an access of the non-local requestor to the set of resources during the session is performed using the local domain authenticator and the credential.

2. The system of claim 1, wherein the remote authenticator has a local domain account with the local domain authenticator.

3. The system of claim 1, wherein the remote authenticator is one of a plurality of remote authenticators.

4. The system of claim 1, wherein the plurality of remote authenticators are adapted to provide a different level of access or access to different ones of the set of resources.

5. The system of claim 1, wherein the unique identifier is a key.

6. The system of claim 5, wherein the key is associated with the domain.

7. The system of claim 1, wherein the local domain authenticator is a directory service.

8. The system of claim 1, wherein the session is a single session.

9. The system of claim 1, wherein the set of resources are networked physical or logical resources of the domain.

10. The system of claim 1, wherein the request is a request for an authentication service provided by the remote authenticator.

11. A method, comprising:
    receiving, at a remote authenticator in a domain with a set of resources, an authentication request from a non-local requestor which is not a member of the domain, wherein the request is a request to be authenticated for accessing the set of resources;
    authenticating the non-local requestor using the authentication request utilizing a secure channel established with the non-local requestor based on a unique identifier associated with both that domain and the non-local requestor;
    accessing a local domain authenticator to obtain a credential, wherein the credential is for a member of the domain to use in accessing the set of resources of the domain during a session; and
    providing the credential to the non-local requestor, wherein the non-local requestor can access the set of resources of the domain during the session maintained between the non-local requestor and the domain using the credential and authentication of an access of the non-local requestor to the set of resources during the session is performed using the local domain authenticator to authenticate the credential.

12. The method of claim 11, wherein the remote authenticator has a local domain account with the local domain authenticator.

13. The method of claim 11, wherein the remote authenticator is one of a plurality of remote authenticators.

14. The method of claim 11, wherein the plurality of remote authenticators are adapted to provide a different level of access or access to different ones of the set of resources.

15. The method of claim 11, wherein the unique identifier is a key.

16. The method of claim 15, wherein the key is associated with the domain.

17. The method of claim 11, wherein the local domain authenticator is a directory service.

18. The method of claim 11, wherein the session is a single session.

19. The method of claim 11, wherein the set of resources are networked physical or logical resources of the domain.

20. The method of claim 11, wherein the request is a request for an authentication service provided by the remote authenticator.

* * * * *